(12) United States Patent
Korthout et al.

(10) Patent No.: US 7,277,130 B2
(45) Date of Patent: Oct. 2, 2007

(54) IMAGE PICK-UP DEVICE AND CAMERA SYSTEM COMPRISING AN IMAGE PICK-UP DEVICE

(75) Inventors: Alouisius Wilhelmus Marinus Korthout, Eindhoven (NL); Willem Hoekstra, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 651 days.

(21) Appl. No.: 10/498,954

(22) PCT Filed: Dec. 3, 2002

(86) PCT No.: PCT/IB02/05138

§ 371 (c)(1),
(2), (4) Date: Jun. 16, 2004

(87) PCT Pub. No.: WO03/054922

PCT Pub. Date: Jul. 3, 2003

(65) Prior Publication Data

US 2005/0128326 A1    Jun. 16, 2005

(30) Foreign Application Priority Data

Dec. 21, 2001   (EP)   ................... 01205135

(51) Int. Cl.
*H04N 3/14*     (2006.01)
*H04N 5/335*    (2006.01)
*H04N 5/217*    (2006.01)
*H01L 27/00*    (2006.01)

(52) U.S. Cl. .................... 348/308; 348/241; 250/208.1
(58) Field of Classification Search ................ 348/241, 348/281, 302, 307, 308
See application file for complete search history.

(56) References Cited

U.S. PATENT DOCUMENTS

| 5,541,402 | A | * | 7/1996 | Ackland et al. | ......... 250/208.1 |
| 5,917,547 | A | * | 6/1999 | Merrill et al. | .............. 348/308 |
| 6,043,478 | A | | 3/2000 | Wang | |
| 6,111,245 | A | | 8/2000 | Hsu | |

(Continued)

FOREIGN PATENT DOCUMENTS

EP        0 908 957 A1    4/1999

(Continued)

*Primary Examiner*—John M. Villecco

(57) ABSTRACT

The invention relates to an image pick up device (401) with pixels arranged in rows and columns. Every pixel (301) comprises a photosensitive element (302), a floating diffusion (304), a transfer transistor (303), an amplifying transistor (305) having its control electrode connected to the floating diffusion (304), and a reset transistor (306). An external node (310) is coupled to a selection switch via a row selection bus (406). The selection switch (411) provides either a first bias voltage, generated by a first voltage source (409), or a second bias voltage, generated by a second voltage source (410), to the row selection bus (406). Applying the first bias voltage and simultaneously turning on the reset transistor (306) programs the floating diffusion (304) to the first bias voltage which biases the amplifying transistor (305) in an on-mode, thereby selecting the pixel (301). Likewise, applying the second bias voltage biases, the amplifying transistor (305) in an off-mode, thereby deselecting the pixel (301). This way of selecting and deselecting pixels avoids the need for a separate selection transistor in every pixel, thereby increasing the fill factor of the pixels. This approach is especially useful for image pick up devices applying correlated double sampling (CDS).

9 Claims, 3 Drawing Sheets

U.S. PATENT DOCUMENTS

| | | | |
|---|---|---|---|
| 6,211,510 B1 * | 4/2001 | Merrill et al. | 348/302 |
| 6,704,050 B1 * | 3/2004 | Washkurak et al. | 348/302 |
| 6,727,946 B1 * | 4/2004 | Zhao et al. | 348/308 |
| 6,881,944 B2 * | 4/2005 | Ohsawa et al. | 348/302 |
| 6,888,572 B1 * | 5/2005 | Kozlowski | 348/308 |
| 6,911,640 B1 * | 6/2005 | Bencuya et al. | 348/308 |
| 6,958,776 B2 * | 10/2005 | Mendis et al. | 348/308 |
| 2004/0174450 A1 * | 9/2004 | Lee et al. | 348/308 |
| 2004/0196397 A1 * | 10/2004 | Beck et al. | 348/308 |
| 2006/0044438 A1 * | 3/2006 | Mauritzson et al. | 348/308 |
| 2006/0203114 A1 * | 9/2006 | Xu | 348/308 |
| 2006/0238634 A1 * | 10/2006 | Yan | 348/308 |

FOREIGN PATENT DOCUMENTS

| | | |
|---|---|---|
| EP | 1 003 220 A1 | 5/2000 |
| EP | 1017107 | 7/2000 |

* cited by examiner

IMAGE PICK-UP DEVICE AND CAMERA SYSTEM COMPRISING AN IMAGE PICK-UP DEVICE

The invention relates to an image pick-up device comprising a plurality of pixels, at least one pixel comprising a photosensitive element for converting light into an electrical charge, a charge-to-voltage conversion node for converting said electrical charge into a voltage level, a transfer transistor having its main conductive channel connected between said photosensitive element and said charge-to-voltage conversion node, an amplifying transistor having its control electrode connected to said charge-to-voltage conversion node and its main conductive channel connected to a first external node of said pixel and coupled to a second external node of said pixel, and a reset transistor having its main conductive channel connected between said charge-to-voltage conversion node and said second external node.

The invention also relates to a camera system comprising optical means to focus an image on an image section of an image pick-up device.

Such an image pick-up device is commonly known as an Active Pixel Sensor (APS) imager. Such APS imagers are usually realized as solid state imagers in a Complementary Metal-Oxide Semiconductor (CMOS) integrated circuit (IC) process. In normal use an APS imager may be part of a camera system, for example, a Digital Still Camera, a webcam, a video camera recorder (camcorder), or a mobile application such as a cellular phone.

In its basic form an APS imager consists of an imaging section and a read-out section. The imaging section comprises a matrix of so-called picture elements or pixels which are arranged in rows and columns. An example of a conventional pixel is shown in FIG. 1. Such a pixel is also known as a "4T-pixel". Optical means project an image on the image section. Each pixel is arranged to convert incident light into an electrical signal by means of a photosensitive element, generally being a photodiode or a photogate. The photosensitive element generates an electrical charge every time it is exposed to light. After exposure this charge is transferred to a charge-to-voltage conversion node, e.g. a floating diffusion. The voltage level of the floating diffusion is proportional to the charge stored on it. This charge is the sum of the charge collected by the photosensitive element and a so-called zero light level charge generated by noise sources. Using a source follower or amplifying transistor, the voltage level of the floating diffusion is copied to the source of the source follower transistor which is coupled to a first external node of the pixel. The drain of the source follower transistor is connected to a second external node of the pixel which is used for biasing purposes.

Using a sample & hold (SH) circuit in the read-out section of the imager, the voltage of the first external node of the pixel (the pixel signal), is sampled for further processing. To increase the performance of the pixel, Correlated Double Sampling (CDS) may be applied. In an APS imager applying CDS first the zero light voltage level of the floating diffusion is sampled and then the voltage level of the floating diffusion after the light collected by the photosensitive element has been transferred. The influence of the noise, reflected in the zero light level charge, is eliminated by subtracting the first sample from the second sample. This requires a transfer transistor within the pixel that controls the charge transfer from the photosensitive element to the floating diffusion.

Furthermore, APS imagers are usually read out on a row by row basis where every column of pixels shares the same SH circuit. To prevent mixing of pixel signals of different pixels in one column, conventional APS imagers comprise a selection transistor, the main conductive channel of which couples the source of the source follower transistor to the first external node of the pixel.

Finally, the voltage level of the floating diffusion needs to be reset to a predetermined level before the pixel signal can be read out again. To this end, the pixel comprises a reset gate, usually a reset transistor, whose main conductive channel connects the floating diffusion and the second external node of the pixel.

As a result of the number of transistors required, the fill factor of a pixel in a conventional CDS APS imager is relatively low. This means that a relatively small area of a pixel is available for the photosensitive element. The remaining area is mostly taken up by the transistors and the wiring necessary to connect these transistors to the read-out section. Furthermore, the minimum area of a pixel is determined largely by the number of transistors within a pixel. The conventional pixel thus has the disadvantage that it limits the number of pixels that fit on a given area of an image section, hereby limiting the feasible resolution of the CDS APS imager. European Patent Application EP-A 1 017 107 discloses a solution for CDS APS imagers with photogates as photosensitive elements. A pixel according to this EP-A 1 017 107 is shown in FIG. 2. In the pixel disclosed therein the selection transistor has been eliminated. Instead the floating diffusion of the pixel is used to bias the source follower transistor in an off-state, thereby deselecting the pixel, and in an on-state wherein it functions as a source follower, thereby selecting the pixel. To this end, the drain of the reset transistor is coupled to a voltage source controlling the operation of the photogate. The source follower transistor is biased either in its off-mode or its on-mode by applying the appropriate bias voltage level via this voltage source and by simultaneously turning on the reset transistor. However, since the specific operation of the photogate is utilized, the disclosed solution is only applicable to CDS APS imagers that utilize photogates.

It is inter alia an object of the invention to provide an image pick up device comprising a pixel with an increased fill factor wherein photodiodes may be used as photosensitive elements.

To this end, the invention provides an image pick-up device as defined in the opening paragraph which is characterized in that said second external node is coupled to biasing means for providing at least two different voltage levels to said charge-to-voltage conversion node in order to bias said amplifying transistor in an off-mode and in an on-mode, respectively.

The voltage applied to the control electrode of said amplifying transistor determines the mode of operation of the amplifying transistor. Application of a first voltage level to the control electrode of the amplifying transistor ensures that no electric current can flow through the main conductive channel of the amplifying transistor. The amplifying transistor is then biased in an off-mode. Thus, by providing said first voltage level to the charge-to-voltage conversion node of said pixel it is ensured that the pixel does not generate a pixel signal. Application of a second voltage level to the control electrode of the amplifying transistor ensures that an electric current can flow through the main conductive channel of the amplifying transistor. The amplifying transistor is then biased in an on-mode. Thus, by providing said second voltage level to the charge-to-voltage conversion node of said pixel it is ensured that the pixel generates a pixel signal. Summarizing, said pixel is deselected and selected by providing said first and said second voltage level, respectively, to the charge-to-voltage conversion node. This eliminates the need for a selection transistor, thus resulting in a pixel with an increased fill factor wherein photodiodes may be used as photo sensitive elements.

An embodiment of the image pick up device according to the invention is characterized in that said pixels are arranged in rows and columns which constitute a matrix, the second external nodes of pixels within a row being connected to a row selection bus. Arranging the pixels in rows and columns and connecting the second external nodes of pixels within a row to the same row selection bus enables pixels to be selected and deselected on a row by row basis. In this way one row of pixels may be selected while the remaining rows may be deselected. This ensures that only one pixel is selected within every column while the remaining pixels in the column are deselected. Providing one SH circuit per column enables the pixels to be read-out on a row by row basis, since it is ensured that every SH circuit receives the pixel signal of a single pixel at its input.

A further embodiment of the image pick up device according to the invention is characterized in that said biasing means comprise a first voltage source for providing a first bias voltage, a second voltage source for providing a second bias voltage, and a selection switch for coupling either said first voltage source or said second voltage source to said row selection bus. Said selection switch ensures that only the bias voltage of one voltage source is provided to said row selection bus and hence to the charge-to-voltage conversion nodes of the pixels connected to the row selection bus. It is relatively easy to design and realize such a selection switch in the IC technology wherein the APS image pick-up device is realized. Furthermore, it is relatively easy to provide for voltage sources which supply the first and second bias voltages, respectively. The voltage sources may be part of the APS image pick up device itself or may be external voltage sources which are coupled to the selection switch in a usual way. The first bias voltage is chosen such that, if provided to the floating diffusion, it biases the amplifying transistor in the off-mode, while the second bias voltage is chosen such that, if provided to the floating diffusion, it biases the amplifying transistor in the on-mode.

A camera system according to the invention is characterized in that it comprises an image pick-up device according to the invention. In such a camera system images are projected via optical means, on to the image section of the image pick-up device. An advantage of such a camera system is that it has a higher sensitivity, because the pixels within the image pick-up device have an increased fill factor. Therefore, it may be used under lighting conditions that are too poor for conventional camera systems.

These and other aspects of the invention will be apparent from and elucidated, by way of example, with reference to the following drawings.

In these Figures corresponding parts are denoted by corresponding references.

Figure 1:
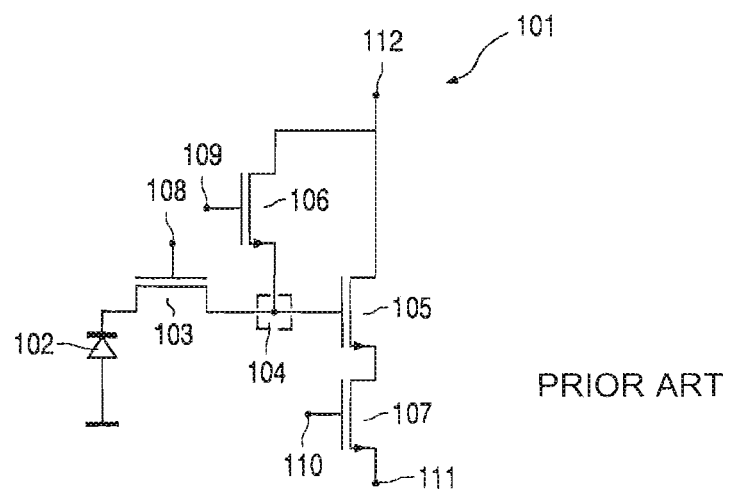
FIG. 1 is a diagram showing a pixel of a known image pick-up device.

FIG. 1 is a diagram showing a pixel of a known image pick-up device. The pixel 101 is also known as a "4T-pixel". It comprises a photodiode 102, a transfer transistor 103, a floating diffusion 104, a source follower transistor 105, a reset transistor 106, and a selection transistor 107. In the shown embodiment all transistors are MOSFETs. The anode of the photodiode 102 is connected to ground. The cathode of the photodiode 102 is connected to the floating diffusion 104 via the transfer transistor 103. The operation of the transfer transistor 103 is controlled by a transfer signal applied to the transfer gate 108. The gate of the source follower transistor 105 is connected to the floating diffusion 104. The source of the source follower transistor 105 is connected to the drain of the selection transistor 107. The drain of the source follower transistor 105 is connected to the drain of the reset transistor 106 and to the second external node 112 of the pixel. The source of the reset transistor 106 is connected to the floating diffusion 104. The operation of the reset transistor 106 is controlled by a reset signal applied to the reset gate 109. The source of the selection transistor 107 is connected to the first external node 111 of the pixel. The operation of the selection transistor 107 is controlled by a selection signal applied to the selection gate 110. The second external node 112 of the pixel is coupled to a DC voltage source, not shown in FIG. 1, that provides a reference voltage, $V_{HIGH}$. $V_{HIGH}$ is usually lower than the positive power supply. However, for practical reasons it may be advantageous to choose $V_{HIGH}$ equal to the power supply voltage. The first external node 111 of the pixel is connected to a sample and hold circuit (SH circuit), in the read-out section of the image sensor.

Depending on the voltage level present at the transfer gate 108, a conductive channel is present or absent between the cathode of the photodiode 102 and the floating diffusion 104. In the presence of a conductive channel, the charge collected by the photodiode 102 is transferred to the floating diffusion 104.

During a predetermined integration time charge is collected in the photodiode 102. This charge is generated by the energy of the light that reaches the photodiode 102. At the end of the integration time, the collected charge is transferred from the photodiode 102 to the floating diffusion 104 by applying a pulse signal to the transfer gate 108. Before the charge is transferred to the floating diffusion 104, the floating diffusion 104 is set to a predefined state by applying a reset signal to the reset gate 109. Subsequently, the selection transistor 107 is turned on by applying a selection signal at the gate 110 and by providing a predetermined current through the conductive channel of the source follower transistor 105. As a result, the voltage level of the floating diffusion 104 is copied (with a DC-shift) to the first external node 111 of the pixel where it is sampled by the SH circuit in the read-out section of the image sensor. The first sample represents the reference level of the floating diffusion. Subsequently, the charge collected in the photodiode 102 is transferred to the floating diffusion 104. This charge dump results in a change in voltage level of the floating diffusion 104 that is proportional to the amount of charge collected by the photodiode 102. The voltage level of the floating diffusion 104 is copied (with a DC-shift) to the first external node 111 of the pixel where it is sampled by the SH circuit in the read-out section. This second sample is a summation of the reference level and the signal level of the floating diffusion 104. After the charge has been transferred from the photodiode 102 to the floating diffusion 104, the next integration period of the photodiode 102 starts.

When the first sample is substracted from the second sample, just the signal level of the floating diffusion 104 remains; it is proportional to the amount of charge collected by the photodiode. This is the principle of Correlated Double Sampling (CDS). CDS has the advantage that it suppresses reset and 1/f noise. This results in an optimal noise performance of the pixel and hence of the image sensor.

An important factor in the performance of a solid-state imager, such as a CMOS imager, is the fill factor of a pixel. The fill factor is the ratio of the photo sensitive area of the photodiode to the area of a pixel as a whole. The larger the photo sensitive area of the photodiode, the more charge can be stored therein. The more charge can be stored in a pixel, the higher its dynamic range will be. A disadvantage of CMOS imagers as described above is that they have a relatively low fill factor.

Figure 2:
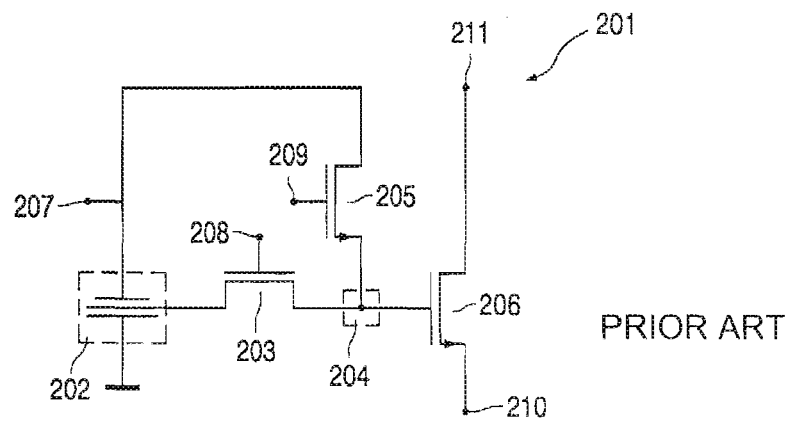
FIG. 2 is a diagram showing a pixel of a further known image pick-up device.

FIG. 2 is a diagram showing a pixel as disclosed in EP-A 1 017 107. The pixel 201 comprises a photogate 202, a transfer transistor 203, a floating diffusion 204, a source follower transistor 206, and a reset transistor 205. The photogate is connected to ground and, via the transfer transistor 203, to the floating diffusion 204. The operation of the photogate 202 is controlled by a signal applied to the control terminal 207. The operation of the transfer transistor 203 is controlled by a transfer signal applied to the transfer gate 208. The gate of the source follower transistor 206 is connected to the floating diffusion 204. The source of the source follower transistor 206 is connected to a first external node 210 of the pixel. The drain of the source follower transistor 206 is connected to a second external node 211 of the pixel. The source of the reset transistor 205 is connected to the floating diffusion 204. The drain of the reset transistor 205 is connected to the control terminal 207. The operation of the reset transistor 205 is controlled by a reset signal applied to the reset gate 209. All transistors in this embodiment are MOSFETs.

The basic operation of the pixel 201 is similar to that of the pixel 101 shown in FIG. 1. During a predetermined integration time, charge is collected in the photogate 202. This charge is generated by the energy of the light that reaches the photogate 202. At the end of the integration time, the collected charge is transferred from the photogate 202 to the floating diffusion 204 by applying a pulse signal to the transfer gate 208. This results in a change of voltage level of the floating diffusion 204. Line in the pixel 101 shown in FIG. 1 the voltage level of the floating diffusion 204 is copied to the first external node 210 of the pixel 201 by means of the source follower transistor 206.

The pixel selection mechanism is different from that of the pixel 101 shown in FIG. 1. Whereas in FIG. 1 the pixel 101 is selected and deselected by means of the selection transistor 107, no such selection transistor is present in the pixel 201 of FIG. 2. Instead the source follower transistor 206 is biased to an off-mode by applying a given voltage level to the floating diffusion 204 in order to deselect the pixel. Likewise, the source follower transistor 206 is biased to an on-mode by applying another voltage level to the floating diffusion 204. Applying the aforementioned voltages to the floating diffusion is achieved by means of the control terminal 207 which is used to control the operation of the photogate 202. Bias voltages are applied to the floating diffusion 204 by applying the appropriate bias voltage to the control terminal and by turning on the reset transistor 205.

The pixel 201 has the advantage over the pixel 101 that it saves a selection transistor, thus increasing the fill factor. The clear disadvantage of pixel 201 is that it requires a photogate as a photosensitive element.

Figure 3:
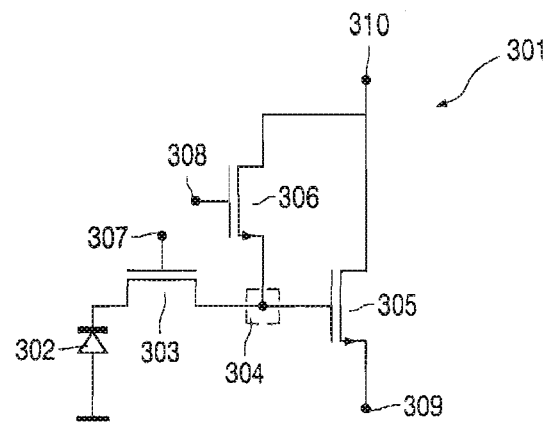
FIG. 3 is a diagram showing a pixel of an image pick-up device according to the invention.

FIG. 3 is a diagram showing a pixel of an image pick-up device according to the invention. The pixel 301 comprises a photodiode 302, a transfer transistor 303, a floating diffusion 304, a source follower transistor 305, and a reset transistor 306. The anode of the photodiode 302 is connected to ground. The cathode of the photodiode 302 is connected to the floating diffusion 304 via the transfer transistor 303. The operation of the transfer transistor 303 is controlled by a transfer signal applied to the transfer gate 307. The gate of the source follower transistor 305 is connected to the floating diffusion 304. The source of the source follower transistor 305 is connected to a first external node 309 of the pixel 301. The drain of the source follower transistor 305 is connected to the drain of the reset transistor 306 and to a second external node 310 of the pixel 301. The source of the reset transistor 306 is connected to the floating diffusion 304. The operation of the reset transistor 306 is controlled by a reset signal applied to the reset gate 308. The transistors in this embodiment are all Insulated Gate Field Effect Transistors (IGFETs). It may be advantageous to apply MOSFETs, although other types of IGFETs may also be applied.

Figure 4:
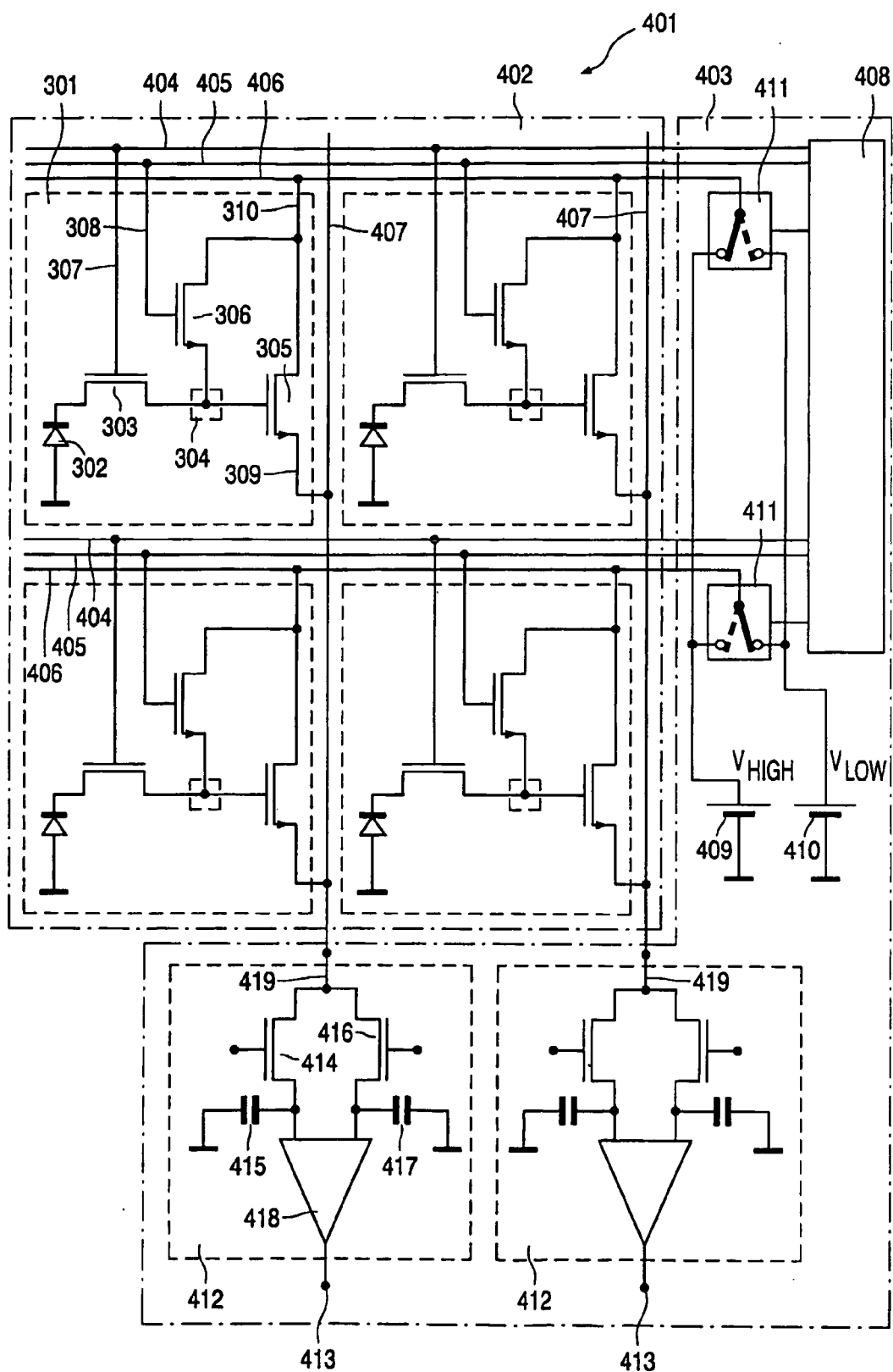
FIG. 4 is a schematic overview of an image pick-up device according to the invention.

The difference with respect to the pixel 101 shown in FIG. 1 consists in the absence of a selection transistor. In practice pixels in an image pick-up device are selected on a row by row basis and not pixel by pixel. Thus it is allowed to remove the selection transistor from the pixel if the addressing and activation required to read a row of pixels is transferred completely to control and selection means within the read-out section. By keeping the total area of a pixel the same, it will be clear that the area available for the photosensitive element, in this case the photodiode, increases. Thus the fill factor of the pixel 301 is higher than the fill factor of the pixel 101. FIG. 4 illustrates how this can be accomplished. Furthermore FIG. 4 explains more in detail the functioning of the pixel 301.

The pixel 201 as shown in FIG. 2 only offers the advantage of an increased fill factor for APS imagers utilizing photogates as photosensitive elements. Through a reduction of components the pixel 301 realizes this advantage for APS imagers using photodiodes as photosensitive elements. An additional advantage of the pixel 301 with respect to the pixel 201 is that the photodiode 302 functionally may be replaced by a photogate. Thus, this design can be advantageously applied both in APS imagers utilizing photodiodes and in APS imagers utilizing photogates.

It may be advantageous to functionally replace the floating diffusion 304 by a floating gate or another capacitive element that is capable of converting charge-to-voltage. Furthermore, when a photodiode with a pinned surface is used, surface leakage currents, will be diverted. This has the additional advantage that a substantial reduction in dark current can be obtained.

Depending on other design choices it may advantageous to realize the pixel 301 while utilizing P-MOSFETs instead of N-MOSFETs as shown in FIG. 3. In that case the biasing of the photodiode, or photogate, should be adapted accordingly.

FIG. 4 is a schematic overview of an image pick up device according to the invention. The image pick-up device 401 comprises an image section 402 and a read-out section 403.

The image section 402 comprises a plurality of pixels 301 arranged in a matrix of rows and columns. The image section 402 also comprises a plurality of transfer buses, a plurality of reset buses, and a plurality of row select buses. Each row of pixels 301 has its own transfer bus 404, reset bus 405 and row select bus 406. The transfer gates 307 of the pixels 301 located in the same row are connected to the same transfer bus 404; the reset gates 308 of the pixels 301 located in the same row are connected to the same reset bus 405 and the second external nodes 310 of the pixels 301 located in the same row are connected to the same row select bus 406. The image section 402 also comprises a plurality of read-out buses. Each column of pixels 301 has its own read-out bus 407. The first external nodes 309 of the pixels 301 located in the same column are connected to the same read-out bus 407. This arrangement of buses enables the pixels to be read-out on a row by row basis by first selecting one row of pixels and deselecting the remaining rows and then reading out the pixel signals of the selected pixel in every column.

The read-out section 403 comprises a control and selection block 408 which comprises electronic circuits which are arranged to select and control the operation of the pixels 301 on a row by row basis. Furthermore, the read-out section 403 comprises a first DC voltage source 409, which is arranged to apply a first DC voltage, $V_{HIGH}$, a second DC voltage source 410, which is arranged to apply a second DC voltage, $V_{LOW}$, and a plurality of selection switches. Each selection switch 411 is coupled to one row select bus 406, the first voltage source 409, and the second voltage source 410. In a first mode of operation the switch 411 electrically couples the row selection bus 406 to the first voltage source 409 and in a second mode of operation the switch 411 electrically couples the row selection bus 406 to the second voltage source 410. The control and selection block 408 determines whether the switch 411 operates in the first mode or in the second mode.

The read-out section further comprises a plurality of sample and hold circuits 412. Each sample and hold circuit comprises an input 419, which is connected to a read-out bus 407, and an output 413. Each sample and hold circuit also comprises a first switch 414 and a first hold capacitor 415, a second switch 416 and a second hold capacitor 417, and a differential amplifier 418. The first hold capacitor 415 is connected to a first input of the differential amplifier and coupled to the read-out bus 407 via the first switch 414. The second hold capacitor 417 is connected to a second input of the differential amplifier and coupled to the read-out bus 407 via the second switch 416. The output of the differential amplifier 418 forms the output 413 of the sample and hold circuit.

In operation the sample and hold circuit 412 performs correlated double sampling to read out the pixels 301. By means of the first switch 414 and the first hold capacitor 415 there is stored a first sample that represents the reference level of the floating diffusion 304 of the pixel 301 being read out. By means of the second switch 416 and the second hold capacitor 417 there is stored a second sample that represents the summation of the reference level and the signal level of the floating diffusion of the pixel 301 being read out. The differential amplifier 418 substracts the first sample from the second sample. The resultant difference is amplified and appears as a pixel output signal at the output 413 of the sample and hold circuit 412.

A pixel is selected and deselected by programming or setting the voltage level of the floating diffusion 304. The source follower transistor 305 is effectively turned off by programming the voltage level of the floating diffusion 304 of a pixel 301 to $V_{LOW}$, thereby deselecting that pixel. The source follower transistor 305 is effectively turned on by programming the voltage level of the floating diffusion 304 to $V_{HIGH}$. $V_{LOW}$ and $V_{HIGH}$ have to be chosen such that the resultant gate-source voltage of the source follower transistor 305 is well below the threshold voltage in case the floating diffusion 304 is programmed to $V_{LOW}$ and is well above the threshold voltage in case the floating diffusion is programmed to $V_{HIGH}$. In case P-MOSFETs are used instead of the N-MOSFETs shown in FIG. 3 and FIG. 4, the values of $V_{LOW}$ and $V_{HIGH}$ have to be adjusted accordingly.

In operation a pixel 301 in the image pick-up device 401 may be read out in a way involving the following steps:

coupling all row select buses 406 to the voltage source 410 by means of the switches 411, thereby applying $V_{LOW}$ to all row select buses;

applying a reset signal to all reset buses 405, thereby programming the floating diffusion 304 of all pixels 301 to $V_{LOW}$, thus effectively turning off the source follower transistor 305 of all pixels;

coupling the row selection bus 406 of the row of pixels 301 to be read out to the voltage source 409 by means of the switch 411, thereby applying $V_{HIGH}$ to the row selection bus 406 of the row of pixels to be read out;

applying a reset signal to the reset bus 406 of the row of pixels 301 to be read out, thereby programming the floating diffusion 304 of these pixels to $V_{HIGH}$, thus effectively turning on the source follower transistor 305 of the pixels to be read out;

sampling the reference level of the floating diffusion 304 of the pixels 301 to be read out;

transferring the charge stored in the photodiode 302 to the floating diffusion 304 of the pixels 301 to be read out;

sampling the signal plus reference level of the floating diffusion 304 of the pixels 301 to be read out.

The foregoing is an example of how the pixels 301 of the image pick-up device 401 can be read out. It will be clear to a person skilled in the art that this is not the only way and that other ways offering substantially the same result are possible.

Figure 5:
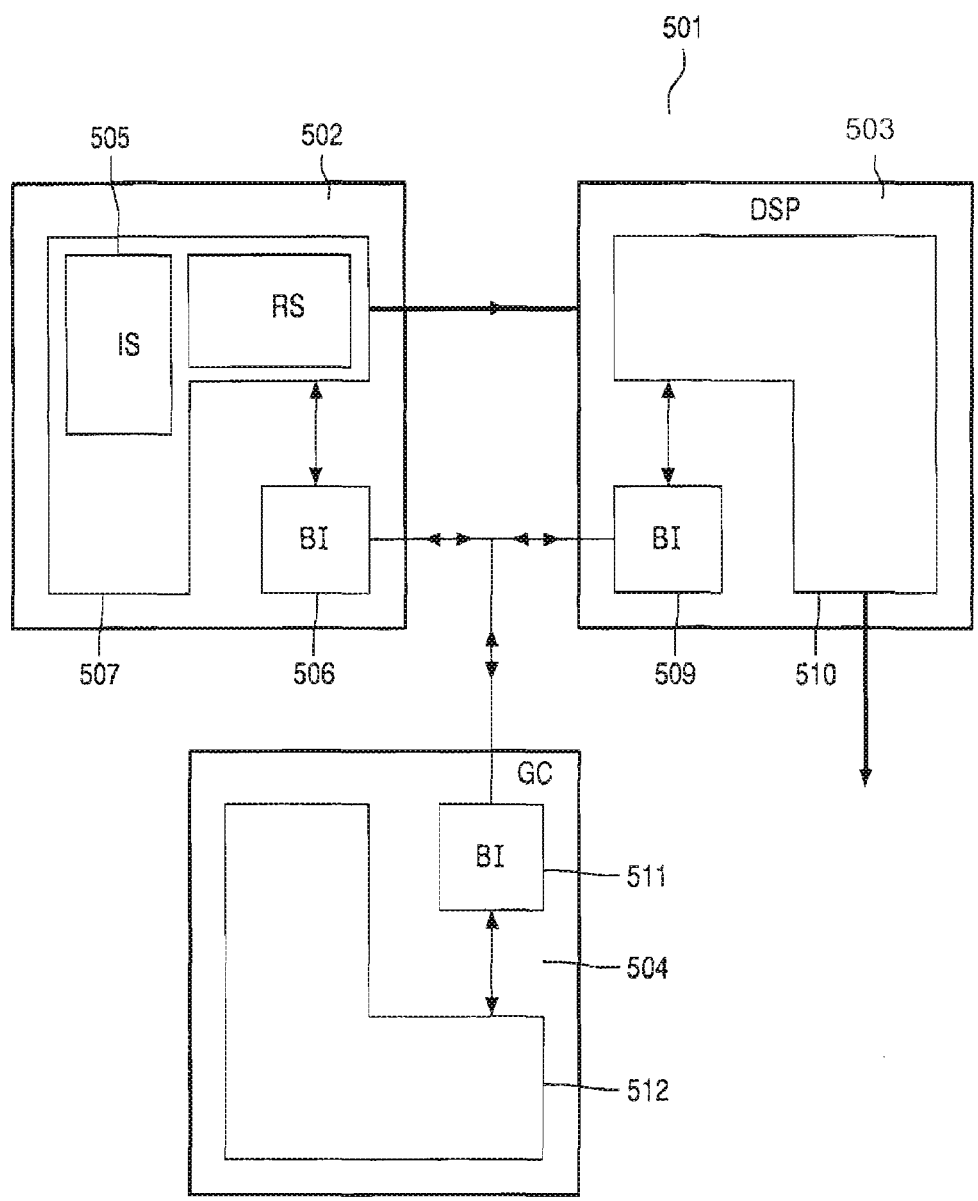
FIG. 5 is a schematic overview of a camera system according to the invention.

FIG. 5 is a schematic overview of a camera system according to the invention. The camera system 501 comprises optical means (not shown) to focus images on an image section 505 of an image pick-up device 502, a digital signal processor 503, and a controller 504. The image pick-up device 502 converts images projected onto the image section 505 into electrical output signals which are digitized, converted to a suitable format and transmitted to the digital signal processor 503. The digital signal processor 503 performs a number of processing steps, including, for example, color corrections, image format adaptation, or image coding, prior to transmission or storage on suitable means, e.g. a videocassette or hard disk. This is not shown in FIG. 5. The controller 504 co-ordinates the different tasks within the camera system 501.

The image pick-up device 502 is the image pick up device 401 shown in FIG. 4. It comprises a communication bus circuit 506 and other electronic circuitry 507, such as the image section 505 and a read-out section 508. The digital signal processor 503 comprises a communication bus circuit 509 and a DSP core 510 to carry out the actual signal processing. The controller 504 comprises a communication bus circuit 511 and other electronic circuitry 512 to carry out the actual control tasks. The communication bus circuits 506, 509, and 511 are part of the same communication bus. The communication bus facilitates the communication between the image pick-up device 502, the digital signal processor 503, and the controller 504.

It will be clear that alternative embodiments of a camera system with the image pick-up device according to the invention are also possible. A basic embodiment of such a camera system comprises just the optical means to project an image on to the image section 505 of the image pick-up device 502, whereas the pixel output signals are the output signals of the camera system. In a further alternative embodiment of a camera system with the image pick-up device according to the invention the image pick up device 502 and the digital signal processor 503 are integrated in a single integrated circuit. In a further embodiment yet of a camera system with the image pick-up device according to the invention the controller 504 and the bus system comprising the bus interfaces 506, 509, and 511 are omitted.

Furthermore, it will be clear that the aforementioned images are images constituted by electromagnetic radiation of wavelengths within the range visible to the human eye. The images could, for instance, also be infrared images.

Summarizing, the invention relates to an image pick-up device 401 with pixels arranged in rows and columns. Every pixel 301 comprises a photosensitive element 302, a floating diffusion 304, a transfer transistor 303, an amplifying transistor 305 having its control electrode connected to the floating diffusion 304, and a reset transistor 306. An external node 310 is coupled to a selection switch via a row selection bus 406. The selection switch 411 provides either a first bias voltage, generated by a first voltage source 409, or a second bias voltage, generated by a second voltage source 410, to the row selection bus 406. Applying the first bias voltage and simultaneously turning on the reset transistor 306 programs the floating diffusion 304 to the first bias voltage which biases the amplifying transistor 305 in an on-mode, thereby selecting the pixel 301. Likewise, applying the second bias voltage biases the amplifying transistor 305 in an off-mode, thereby deselecting the pixel 301. This way of selecting and deselecting pixels avoids the need for a separate selection transistor in every pixel, thereby increasing the fill factor of the pixels. The approach is especially useful for image pick up devices applying correlated double sampling (CDS).

It is to be understood that the above description is intended to be illustrative and not restrictive. Many embodiments will be apparent to those skilled in the art upon reviewing the above description. The scope of the invention should, therefore, be determined not as reference to the above description, but should instead be determined with reference to the appended claims along with the full scope of equivalence to which such claims are entitled.

For instance, based on design choices, it may be advantageous to read out the pixels on a pixel by pixel basis instead of on a row by row basis. This is facilitated by choosing means other than the row selection bus 406 for coupling the second external node of the pixel 301 to the first and second DC voltage sources.

For instance, a modification of the pixel 301 includes anti-blooming means which consist of an additional transistor having its main conductive channel coupled between the photosensitive element 302 and a further DC voltage source to allow excess charge generated within the photosensitive element to be removed without contributing to the pixel signal, its control electrode being coupled to another further DC voltage source which supplies a predetermined voltage level that controls the maximum charge that can be stored within the photosensitive element.

The invention claimed is:

1. An image pick up device (401) comprising a plurality of pixels, at least one pixel (301) comprising a photosensitive element (302) for converting light into an electrical charge, a charge-to-voltage conversion node (304) for converting said electrical charge into a voltage level, a transfer transistor (303) having its main conductive channel connected between said photosensitive element (302) and said charge-to-voltage conversion node (304), an amplifying transistor (305) having its control electrode connected to said charge-to-voltage conversion node (304) and its main conductive channel connected to a first external node (309) of said pixel and coupled to a second external node (310) of said pixel, and a reset transistor (306) having its main conductive channel connected between said charge-to-voltage conversion node (304) and said second external node (310), characterized in that said second external node (310) is coupled to biasing means (406, 411, 409, 410) for providing at least two different voltage levels to said charge-to-voltage conversion node (304) in order to bias said amplifying transistor (305) in an off-mode and in an on-mode, respectively.

2. An image pick up device according to claim 1, characterized in that said pixels (301) are arranged in rows and columns which constitute a matrix, the second external nodes (310) of pixels within a row being connected to a row selection bus (406).

3. An image pick-up device according to claim 2, characterized in that said biasing means comprise a first voltage source (409) for providing a first bias voltage, a second voltage source (410) for providing a second bias voltage source, and a selection switch (411) for coupling either said first voltage source (409) or said second voltage source (410) to said row selection bus (406).

4. An image pick-up device according to claim 1, characterized in that said photosensitive element (302) comprises a photodiode.

5. An image pick-up device according to claim 1, characterized in that said photosensitive element comprises a photogate.

6. An image pick-up device according to claim 1, characterized in that said amplifying transistor (305) is an insulated gate field effect transistor.

7. An image pick-up device according to claim 1, characterized in that said reset transistor (306) is an insulated gate field effect transistor.

8. An image pick-up device according to claim 1, characterized in that said transfer transistor (303) is an insulated gate field effect transistor.

9. A camera system comprising optical means for focusing an image on to an image section (505) of an image pick-up device (502), characterized in that said image pick up device (502) is an image pick-up device according to claim 1.

* * * * *